(12) United States Patent
Blackwell

(10) Patent No.: US 10,618,585 B2
(45) Date of Patent: Apr. 14, 2020

(54) REMOVABLE BATTERY POWERED MOTORCYCLE HEADLIGHT AND LIGHTING KIT WITH SAME

(71) Applicant: Jonathon Blackwell, Santa Cruz, CA (US)

(72) Inventor: Jonathon Blackwell, Santa Cruz, CA (US)

(*) Notice: Subject to any disclaimer, the term of this patent is extended or adjusted under 35 U.S.C. 154(b) by 0 days.

(21) Appl. No.: 15/960,557

(22) Filed: Apr. 24, 2018

(65) Prior Publication Data

US 2018/0312208 A1    Nov. 1, 2018

Related U.S. Application Data

(60) Provisional application No. 62/490,038, filed on Apr. 26, 2017.

(51) Int. Cl.
| | | |
|---|---|---|
| *B62J 6/02* | (2006.01) | |
| *B62J 6/00* | (2006.01) | |
| *B60Q 1/26* | (2006.01) | |
| *B60Q 1/00* | (2006.01) | |
| *B62J 23/00* | (2006.01) | |
| *B60Q 1/18* | (2006.01) | |
| *B60Q 1/04* | (2006.01) | |
| *B62K 11/04* | (2006.01) | |
| *B62K 21/26* | (2006.01) | |

(52) U.S. Cl.
CPC .............. *B62J 6/02* (2013.01); *B60Q 1/0483* (2013.01); *B60Q 1/18* (2013.01); *B60Q 1/2696* (2013.01); *B62J 6/003* (2013.01); *B62J 23/00* (2013.01); *B60Q 1/0088* (2013.01); *B60Q 2900/10* (2013.01); *B62K 11/04* (2013.01); *B62K 21/26* (2013.01)

(58) Field of Classification Search
CPC ......... B62J 6/02; B60Q 1/0088; B60Q 1/2696
USPC ....................................................... 362/475
See application file for complete search history.

(56) References Cited

U.S. PATENT DOCUMENTS

| | | | | | |
|---|---|---|---|---|---|
| 4,625,264 | A | * | 11/1986 | Nagashima .......... | B60Q 1/0483 362/390 |
| 4,707,770 | A | * | 11/1987 | Van Duyn ............ | B60Q 1/0683 362/528 |
| 4,722,031 | A | * | 1/1988 | Matsuyama ......... | B60Q 1/0683 362/258 |
| 5,086,377 | A | * | 2/1992 | Roberts ............... | F21V 33/0064 222/113 |
| 5,124,892 | A | * | 6/1992 | Lambert ............... | B64D 11/00 362/103 |
| 5,820,254 | A | * | 10/1998 | Duenas ................ | B60Q 1/0088 362/473 |
| 6,227,688 | B1 | * | 5/2001 | Taylor ................. | B62J 6/00 340/432 |
| 6,565,241 | B1 | * | 5/2003 | Glynn .................. | B60Q 1/0017 362/183 |

(Continued)

*Primary Examiner* — Bryon T Gyllstrom
(74) *Attorney, Agent, or Firm* — Michael A. Guth

(57) ABSTRACT

A motorcycle lighting system including a headlamp adapted to be easily mounted upon, and easily removed from, a motorcycle without a headlamp, such as a motocross motorcycle. The headlamp is battery powered and may have removable batteries to allow for substitution during or between rides. The headlamp is mounted with resilient material to enhance vibration resistance. A lighting kit may include handlebar mounted pointable lights also coupled to the headlamp battery.

8 Claims, 13 Drawing Sheets

(56) References Cited

U.S. PATENT DOCUMENTS

| | | | |
|---|---|---|---|
| 7,832,911 B2* | 11/2010 | James | B60Q 1/50 |
| | | | 340/472 |
| 2002/0167817 A1* | 11/2002 | Tatsukawa | B60Q 1/12 |
| | | | 362/523 |
| 2006/0002120 A1* | 1/2006 | Grigg | B60Q 1/0483 |
| | | | 362/475 |
| 2009/0067159 A1* | 3/2009 | Beneski | A62B 35/0006 |
| | | | 362/108 |
| 2012/0300439 A1* | 11/2012 | Davis Hatfield | B62B 9/005 |
| | | | 362/183 |

* cited by examiner

REMOVABLE BATTERY POWERED MOTORCYCLE HEADLIGHT AND LIGHTING KIT WITH SAME

CROSS-REFERENCE TO RELATED APPLICATIONS

This application claims priority to U.S. Provisional Patent Application No. 62/490,038 to Blackwell, filed Apr. 26, 2017, which is hereby incorporated by reference in its entirety.

FIELD OF THE INVENTION

This invention relates to vehicle lighting, namely a battery powered motorcycle headlight and lighting kit. The headlight is adapted to be easily removable.

BACKGROUND

Many models of motorcycles do not come equipped with lighting for riding in the dark. Lights typically include breakable lenses and thus are not appropriate for motorcycles geared towards very rough riding, such as motocross motorcycles and endure motorcycles. In addition to the risk of breakage, the extra weight of a lighting system may not be wanted on motorcycles that are otherwise designed for low weight.

Motorcycles without lighting systems may also be constructed such that they have no batteries. A typical requirement of a street legal motorcycle is that it have lights, and a battery that can keep the lights on for safety for at least 30 minutes without the motor running. Also, motorcycles that are not designed to support lighting systems typically do not have enough power available, when running, from the magneto to power the lights in addition to providing ignition system support. Often a user of a motorcycle not designed to support lighting will replace the magneto windings with an augmented winding type when converting the motorcycle to using lights.

As can be understood, there are a number of motorcycle types which do not come with lighting systems, and in addition do not have electric systems capable of supporting the increased power drain of an addition of lights to the motorcycle. However, users of such motorcycles may nonetheless desire to occasionally engage in riding activities at night.

What is called for is a lighting system for a motorcycle which provides its own power source and is not coupled to the motorcycle electric or ignition system. What is also called for is such a lighting system that is easily removable and replaceable onto a motorcycle otherwise not adapted to support a lighting system.

SUMMARY

A motorcycle lighting system including a headlamp adapted to be easily mounted upon, and easily removed from, a motorcycle without a headlamp, such as a motocross motorcycle. The headlamp is battery powered and may have removable batteries to allow for substitution during or between rides. The headlamp is mounted with resilient material to enhance vibration resistance. A lighting kit may include handlebar mounted pointable lights also coupled to the headlamp battery.

DETAILED DESCRIPTION

Figure 1:
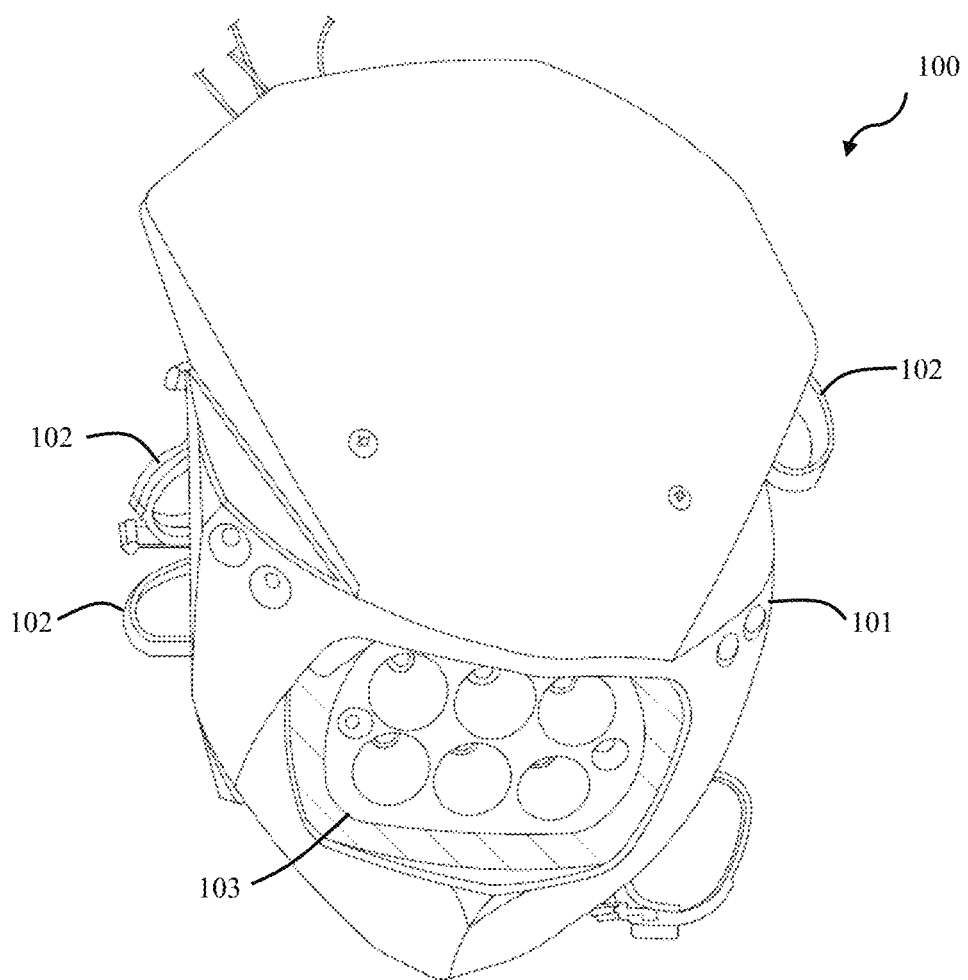
FIG. 1 is a front view of a battery powered headlight according to some embodiments of the present invention.

In some embodiments of the present invention, as seen in FIG. 1, a motorcycle lighting system 100 is comprised of headlight unit 101 with a headlamp 103 that is easily mounted to and also easily removed from the upper end of a fork assembly of a motorcycle. The headlight unit 101 may have flexible attachment members 102 adapted to be attached around the fork tubes in the area of the headset of the motorcycle. The flexible attachment members 102 may allow for reliable snug attachment of the headlight unit 101 to the motorcycle and also provide some vibration damping between the motorcycle and the headlight unit 101.

Figure 2:
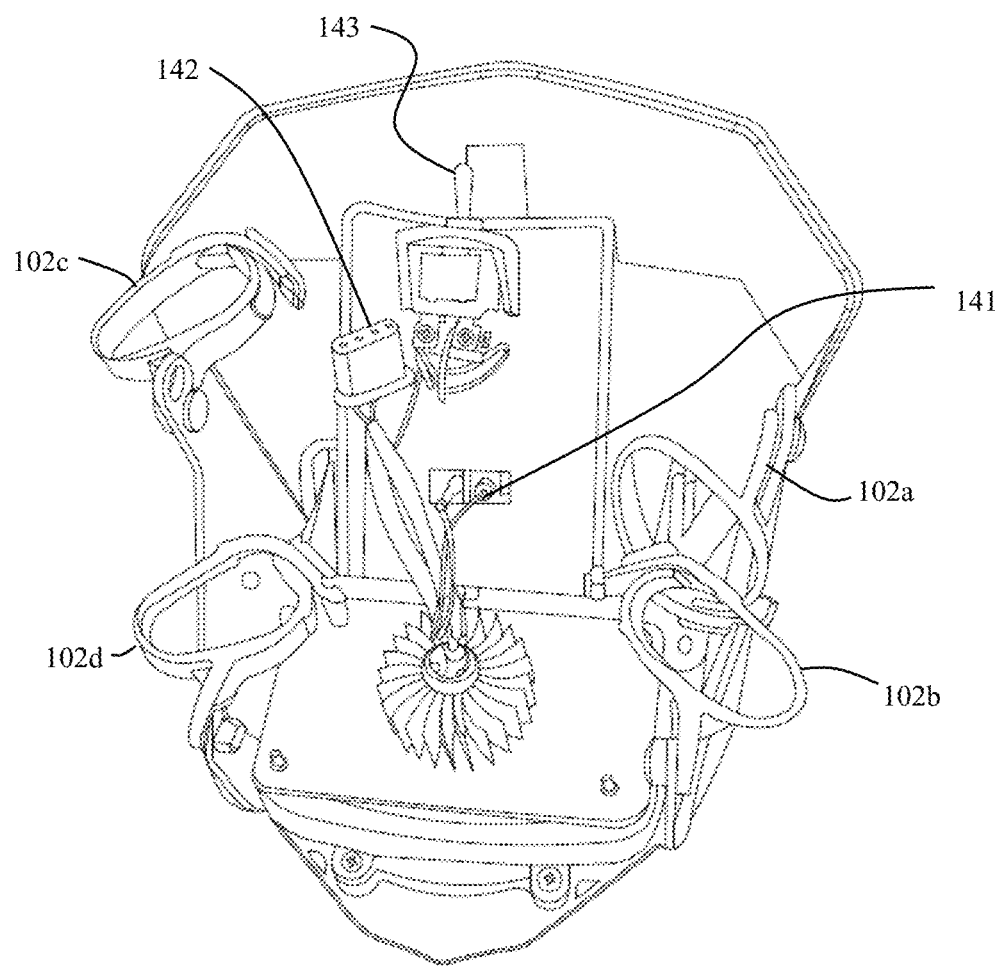
FIG. 2 is a rear view of a battery powered headlight according to some embodiments of the present invention.

As seen in FIG. 2, the right side of the headlight unit may have a right side upper attachment member 102a and a right side lower attachment member 102b. The left side of the headlight unit may have a left side upper attachment member 102c and a left side lower attachment unit 102d. The attachment members 102 may be of a firm but resilient material adapted to route around the upper fork tubes of a motorcycle. The attachment members 102 may be adapted to provide firm attachment to a variety of fork tube diameters. The attachment members 102 may be coupled to the headlight unit 101, and may attached to the motorcycle by stretching the flexible members 102 around the fork tube, or in some aspects another motorcycle headset feature, and then couple back to the flexible member itself or to the headlight unit. The attachment members may be of rubber or a rubberized material. In some aspects, the attachment members may be hook and loop fasteners.

Figure 3:
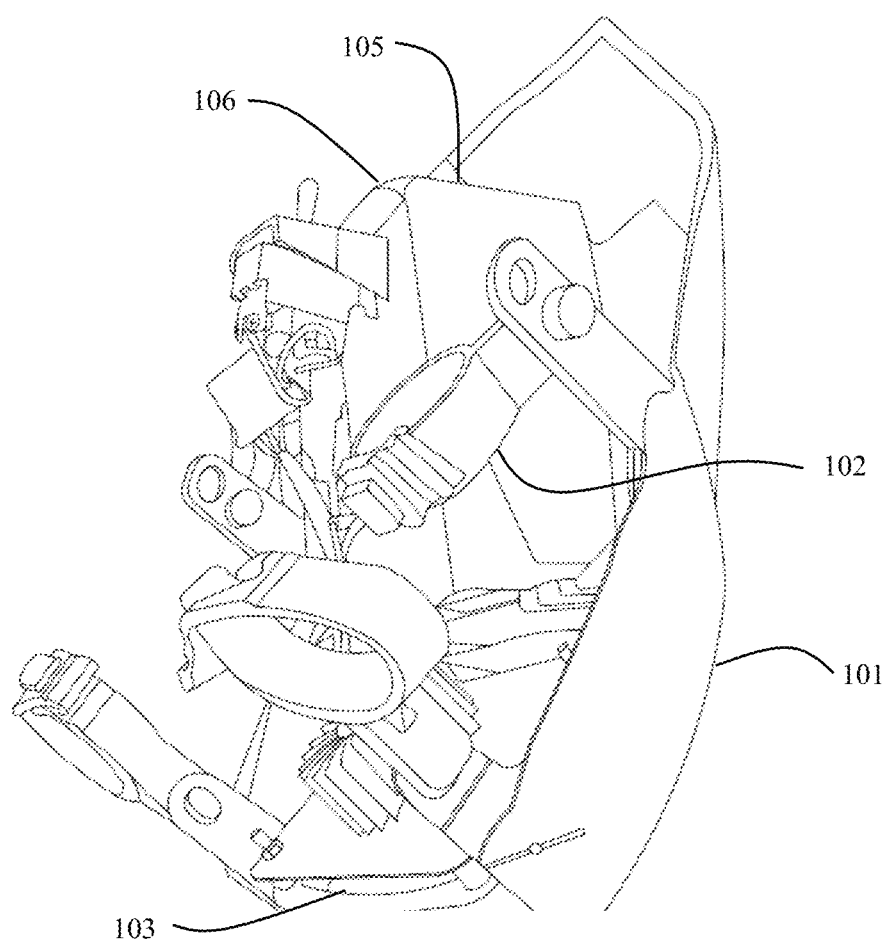
FIG. 3 is a side view of a battery powered headlight according to some embodiments of the present invention.

The main body of the headlight unit 101 may be of plastic or other appropriate material. As seen in FIG. 3, a headlamp resides 103 mounted to and/or within the main body 101 to provide forward lighting for the motorcycle. A battery 105 may be mounted to the headlight unit main body in an area behind the front fairing feature of the headlight unit and above the headlamp 103. The battery 105 may be a rechargeable battery. The battery 105 may be adapted to be easily removable such that a user may use a secondary battery, for example, should the first battery become exhausted. The battery 105 may reside within a battery housing 106 which is coupled to the headlight unit 101. In some aspects, the battery is an 18-20V lithium battery. The headlight and the auxiliary lights may be LED lights with multiple diodes in each fixture.

The headlamp 103 may be coupled to the battery 105 with wires 141. Auxiliary lights may be powered using auxiliary power lines 142. A power switch 143 allows the lights to be turned on and off.

Figure 4:
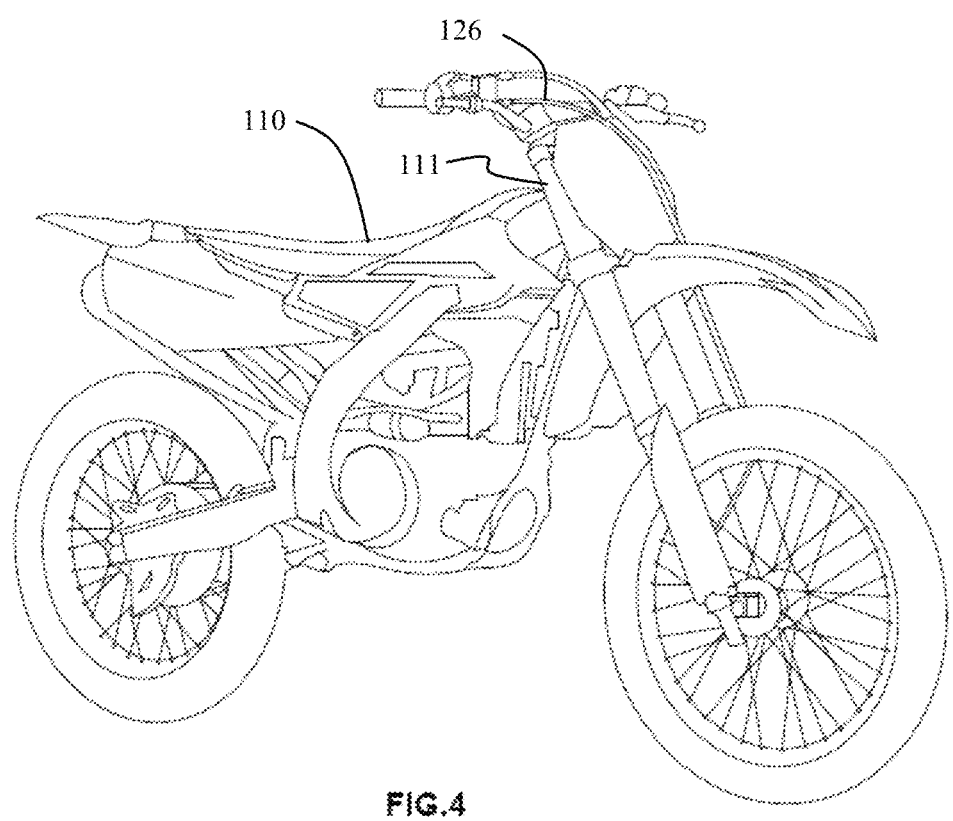
FIG. 4 is a view of a dirt motorcycle.

In some use scenarios, as seen in FIG. 4, the user may have a motorcycle 110 without a lighting system, such as a motocross motorcycle used for off road riding. This user may not want a permanently mounted lighting system as most uses may be during the day, and a lighting system presents damage risk due to the type of rough riding this type of motorcycle may typically experience. Should a user desire to engage in a night ride, or a ride which may extend past the light hours, the user can use a headlight system which is easily attached to the motorcycle for that particular ride, and which is then easily removable thereafter. The headlight system may mount to the fork tubes 111 of the motorcycle 110. Also, the battery may be both removeable and rechargeable, allowing the user to bring a second battery along on an extended ride, for example. In some aspects, the headlight system 100 is waterproof, or highly water resistant, such that the headlight system is capable of functioning in extremely wet environments.

The headlight system 100 may also support auxiliary electronics. An accessory power plug may be mounted on the headlight unit main body in an area behind the front fairing feature of the headlight unit and above the headlamp 103, for example. The accessory power plug may be a 12 volt accessory plug in some aspects. The plug may be a USB plug in some aspects.

Figure 5:
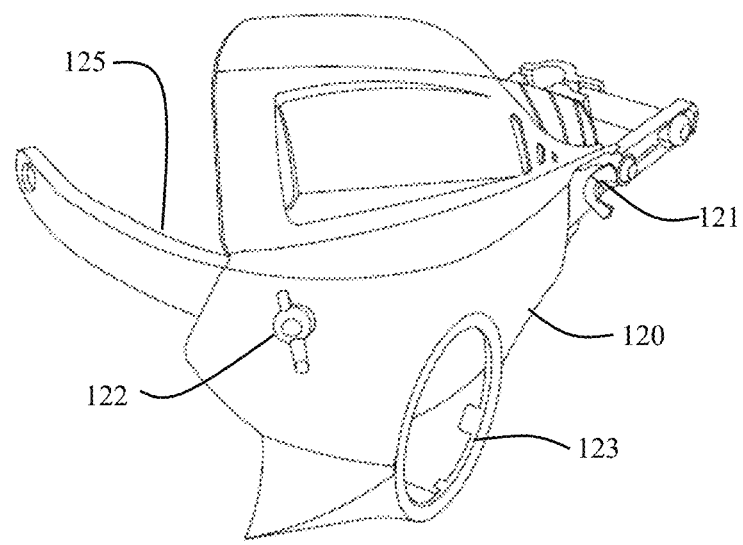
FIG. 5 is a side view of an auxiliary lighting mount according to some embodiments of the present invention.
Figure 6:
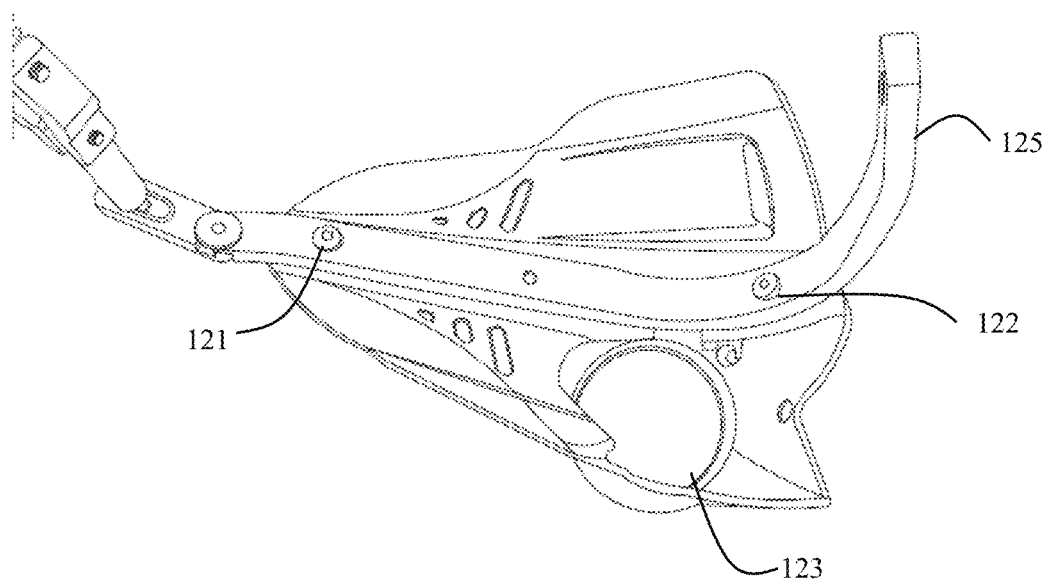
FIG. 6 is a rear view of an auxiliary lighting mount according to some embodiments of the present invention.

Many off road motorcycles adapted for riding in rough riding scenarios have handle bar/hand grip/hand guards adapted to be able withstand an impact in the area of the outer reaches of the handlebar. These guards typically are made of metal, and may be approximately ⅜ inch by ¾ inch in cross section. The bars are able to withstand impacts from bushes and tree branches while protecting what is behind the guard from such impacts, including protection of the rider's hands. FIGS. 5 and 6 illustrate handlebar guards 125 which are adapted to mount onto the motorcycle to provide protection for the rider's hand and for the hand grips and levers. In some embodiments of the present invention, a second lighting aspect of the lighting system includes auxiliary lights which are able to be removably mounted to the handlebar guards 125.

In an exemplary embodiment, a handlebar lighting mount 120 may be mounted onto a handlebar guard 125. The handlebar guard may attach to the end of the motorcycle handlebar on a first end, and to an interior attach point along the motorcycle handlebar on a second end. The handlebar lighting mount 120 may be removable with the use of fasteners 121, 122. The handlebar lighting mount 120 may have a light receptacle 123 adapted to receive an auxiliary light unit 130. As with the headlight unit 101, the handlebar lighting mounts 120 may be easily mounted to support riding when lighting is desired. Each side of the handlebar 126 of the motorcycle 110 may each have a handlebar lighting mount 120, which may be mirror images of each other.

An important aspect of riding motorcycles in rural areas, and on dirt roads and trails, is that there may be no other vehicles around which might help illuminate the road, or to indicate to the motorcycle rider in which direction traffic is flowing. Also, there is little likelihood that there will be any street lighting or other lighting of that type. Further, motorcycles adapted for dirt riding may find the body of the motorcycle and the forks in slightly different attitudes compared to heavier street motorcycles when turning. A circumstance that may occur with a motorcycle while riding in the dirt is that while motorcycle is turning to the left along a certain trajectory, for example, the handlebars may not and probably will not be pointed along that same trajectory. Using the example of a left turn, the handlebars may be, relatively speaking, pointed more towards the right. The same is true in inverse for a right hand turn.

In this type of riding, a motorcycle headlamp pointing directly perpendicular from the plane of the fork tubes, as most motorcycle headlamps are set to do, will not be illuminating the path the dirt motorcycle will take, thus not allowing the rider to see where they are riding into. With the use of an adjustable auxiliary lighting setup, the rider may be able to illuminate the actual path the rider will ride through when turning. In some aspects, an auxiliary light is adapted to be removably mounted to the handlebar guards and used in conjunction with the removeable headlight unit discussed above. The auxiliary light may reside in an auxiliary light housing that is mounted onto the handlebar guard. The auxiliary light may be electrically coupled to the battery and power system of the headlight unit. In some aspects, a rider desiring to illuminate a night ride on a motorcycle otherwise not equipped with lighting may removeably mount the headlight unit to the upper end of the fork tubes, as discussed above. Also, the user may then mount an auxiliary light housing with an auxiliary light attached therein to each of the handlebar guards.

Figure 7:
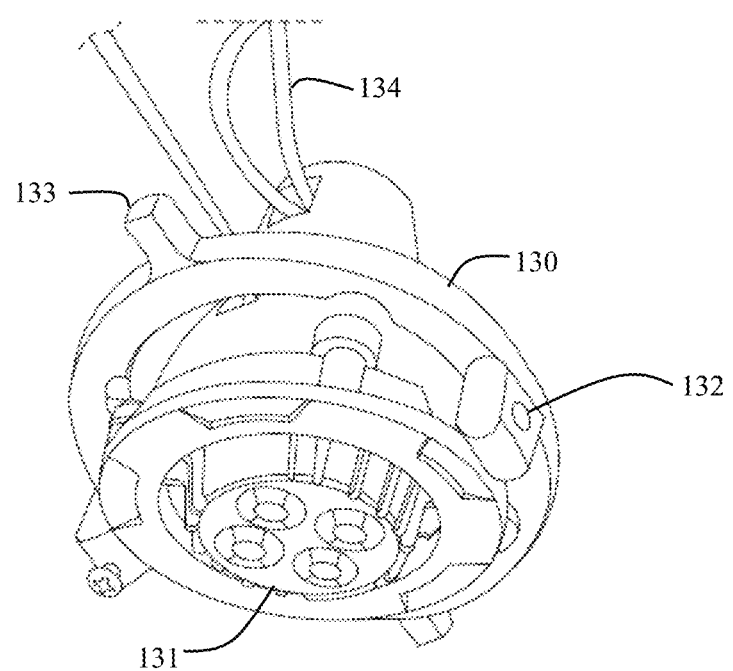
FIG. 7 is a perspective view of an auxiliary light with a 2 axis gimbal according to some embodiments of the present invention.
Figure 8:
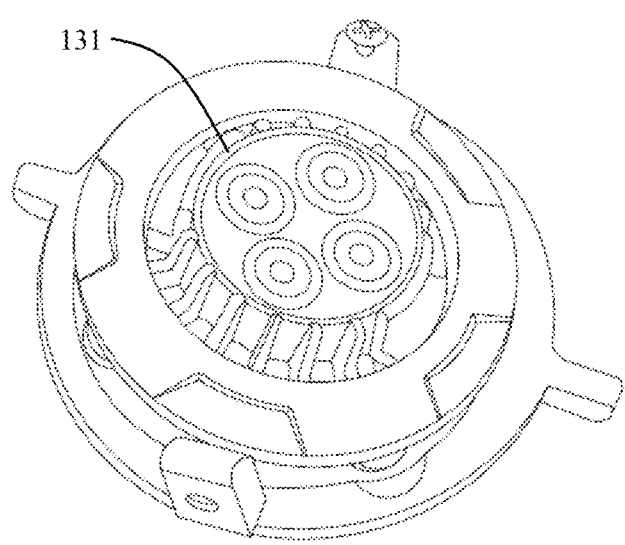
FIG. 8 is a front perspective view of an auxiliary light with a 2 axis gimbal according to some embodiments of the present invention.

FIGS. 7 and 8 illustrate an auxiliary light unit 130 adapted to mount into the light receptacle 123. A feature of the auxiliary lights is that they may be mounted to the auxiliary light housing with a mounting system adapted to allow for the setting of the lights into different pointing directions. For example, if the night ride is on relatively straight roads, the lights may be pointed predominantly forward to augment the main headlight. They might also each be pointing slightly downward to further illuminate the exact terrain ridden over. However, should the ride contain portions where the motorcycle is likely to have a significant amount of angled turning, the auxiliary lights may be significantly outward and facing down, such that lighting will occur in an area that the motorcycle is traveling into. With a dirt motorcycle, the rear end may engage in skidding outward during turning, in a manner not often or ever occurring during street riding, where there is asphalt and significant grip from the tires. Due to the different positioning of the headset and forks of a dirt motorcycle during more extreme or aggressive riding, normal lighting positions will not result in illumination of the area through which the motorcycle will travel, reducing the rider to driving blind in the dark.

The auxiliary light mounting within the auxiliary light housing is adapted to allow for the easy repositioning of a light. The mounting may allow for the rider to adjust the auxiliary light pointing direction by hand and without tools, but then to retain this position without motion during riding. In some embodiments, the auxiliary light unit 130 is mounted with a rotatable inner mount 131, which is able to rotate around a pivot 132 relative to a fixed outer mounted affixed the auxiliary light housing. The inner mount may have a tab extension 133 which allows a rider to adjust the light pointing direction in real time, while riding and while wearing gloves. In some aspects, the rotatable inner mount has a portion of a spherical surface around its inner periphery which resides within a mating internal spherical surface within the fixed outer mount. A frictional fit allows the pointing direction to be altered but holds the light in the selected position once set. With such a system, the light pointing direction may be adjusted while riding in accord with the demands of the ride, while having sufficient holding force to maintain position. Auxiliary light wires 134 may be coupled to the auxiliary power lines 142 to power the auxiliary lights.

Figure 9:
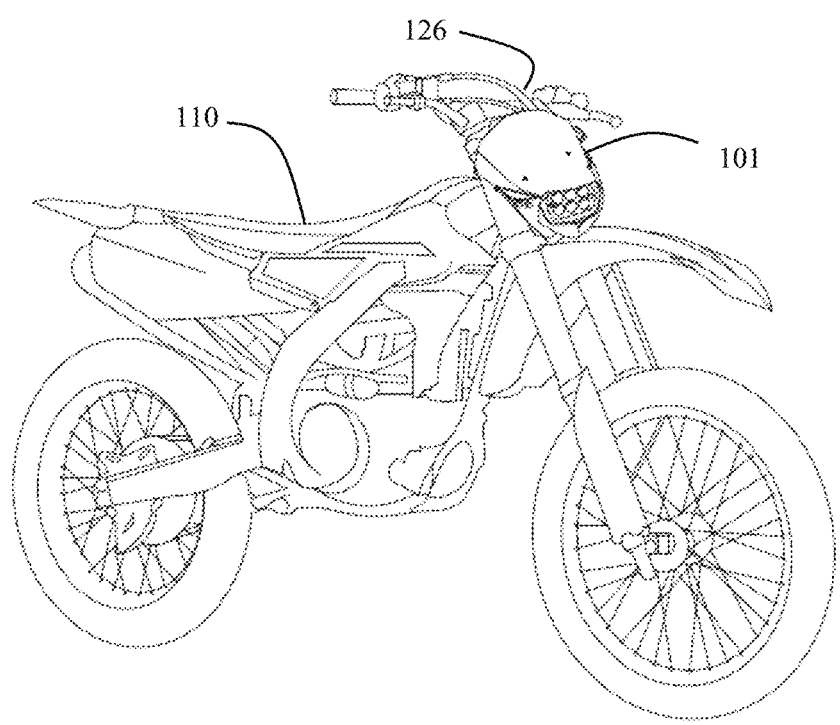
FIG. 9 is a view of a motorcycle with an auxiliary lighting system according to some embodiments of the present invention.
Figure 10:
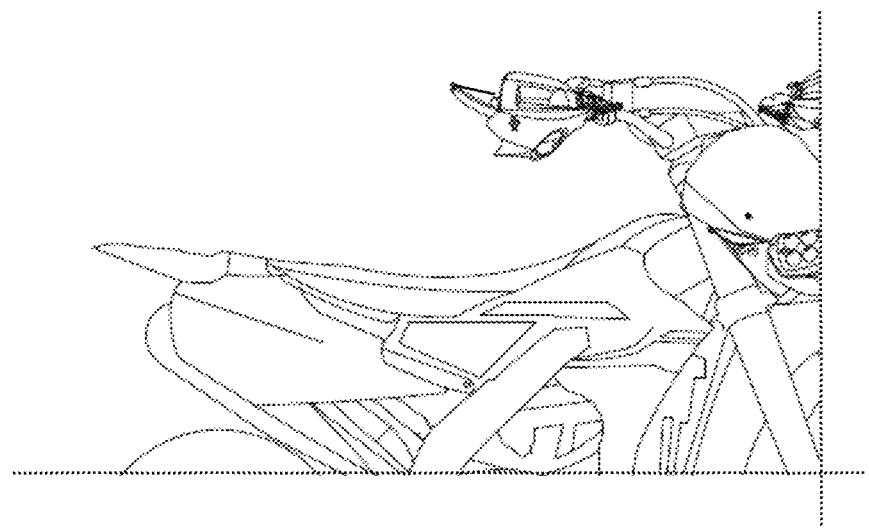
FIG. 10 is a view of a motorcycle with an auxiliary lighting system according to some embodiments of the present invention.

FIG. 9 illustrates a motorcycle with a headlamp unit 101 according to some embodiments of the present invention. The attachment units 102 have been secured to the fork tubes of the motorcycle. FIG. 10 illustrates a motorcycle with a headlamp unit 101 and a handlebar lighting mount on the handlebar, according to some embodiments of the present invention.

Figure 11:
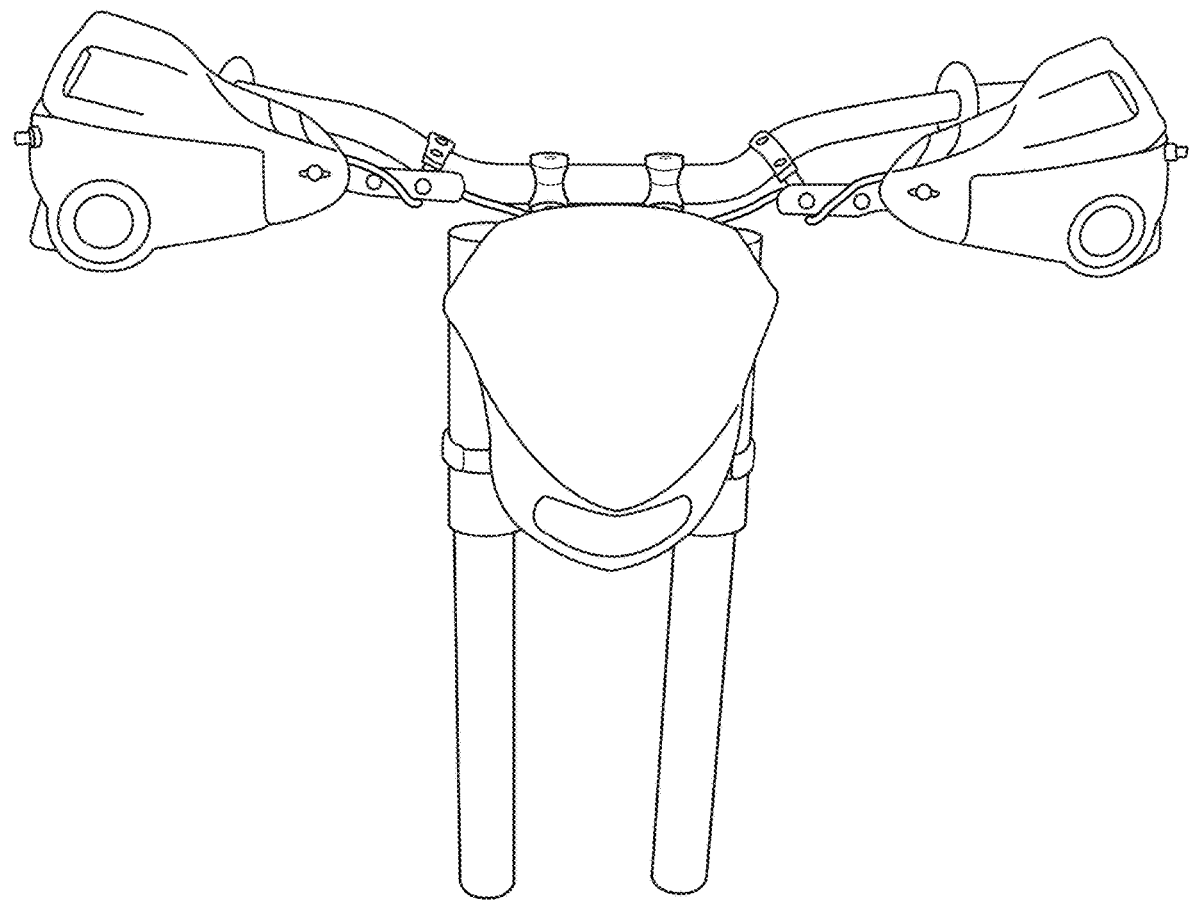
FIG. 11 is a front view photograph of a motorcycle lighting system according to some embodiments of the present invention.
Figure 12:
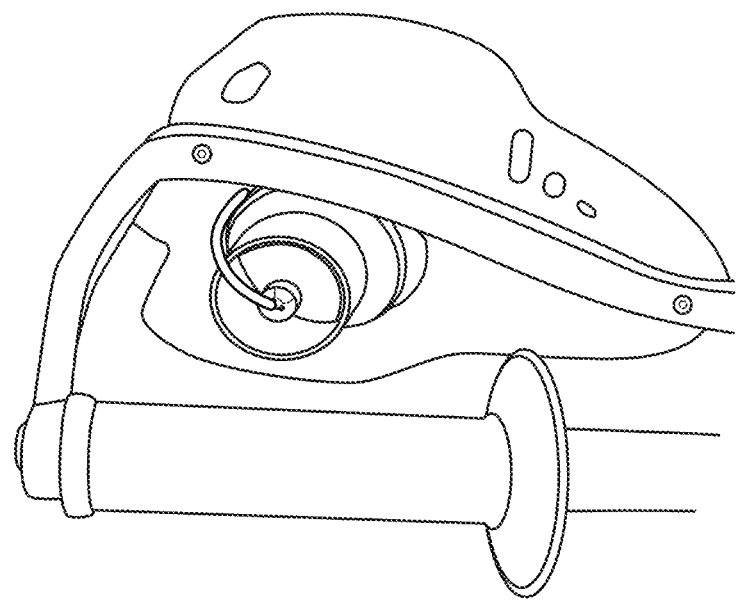
FIG. 12 is a photograph of an auxiliary lighting system according to some embodiments of the present invention.

FIG. 11 is a front view photograph of a motorcycle lighting system according to some embodiments mounted onto a motorcycle fork and front end simulator. A headlight unit is seen mounted with attachment units coupled to the fork tubes. Also seen are handlebar lighting mounts, with auxiliary light units, mounted onto handlebar guards. FIG. 12 is a upper rear perspective view of a handlebar lighting mount mounted onto a handlebar guard.

Figure 13:
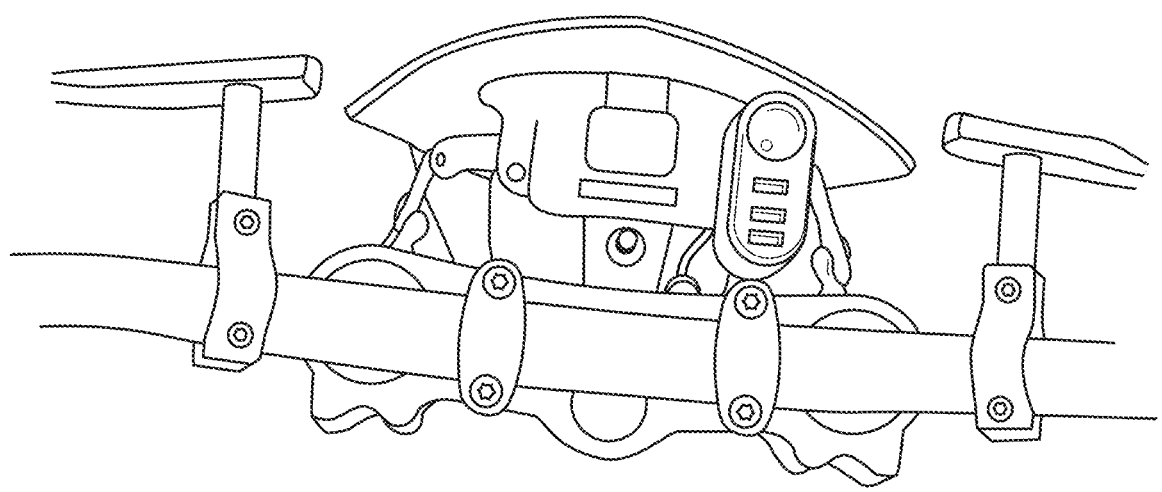
FIG. 13 is a top view photograph of a motorcycle lighting system according to some embodiments of the present invention.
Figure 14:
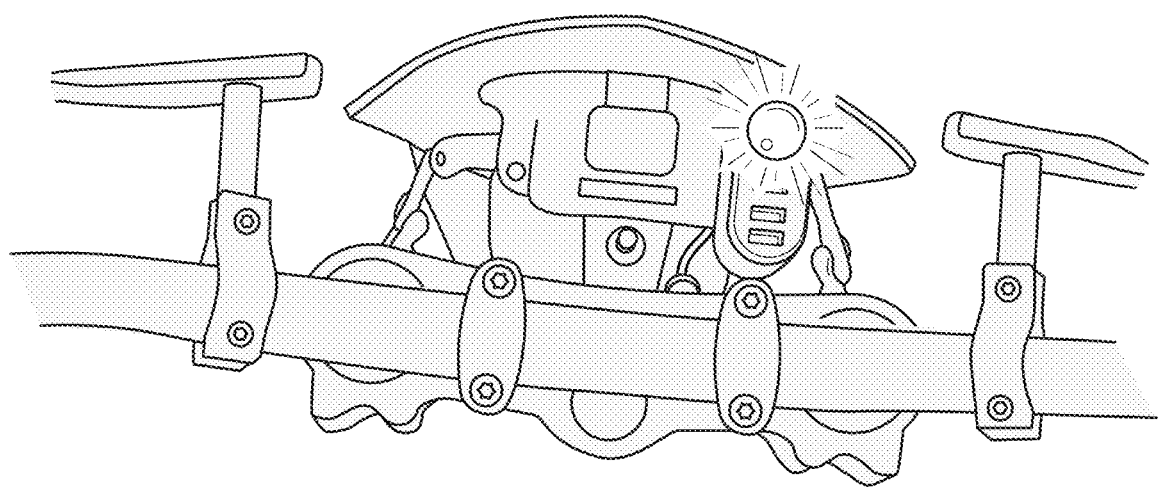
FIG. 14 is a top view photograph of a motorcycle lighting system according to some embodiments of the present invention.

FIGS. 13 and 14 are top view photographs of a motorcycle lighting system according to some embodiments of the present invention. An accessory power plug is mounted on the headlight unit main body in the area behind the front fairing feature of the headlight unit and above the headlamp. The accessory power plug may be a 12 volt accessory plug in some aspects. The plug may be a USB plug in some aspects.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A removeable lighting system for a motorcycle, said removeable lighting system comprising:
   a headlight unit main body;
   a headlight coupled to said headlight unit main body;
   a rechargeable battery, said battery coupled said headlight unit main body and electrically coupled to said headlight; and
   a mounting system for said headlight unit main body, said mounting system adapted to mount said headlight unit main body to the upper end of a motorcycle front end, said mounting system comprising:
      an upper right mounting element, said upper right mounting element coupled to an upper right portion of said headlight unit main body;
      an upper left mounting element, said upper left mounting element coupled to an upper left portion of said headlight unit main body;
      a lower right mounting element, said lower right mounting element coupled to a lower right portion of said headlight unit main body
   a lower left mounting element, said lower left mounting element coupled to an lower left portion of said headlight unit main body;
   a right side auxiliary light unit, said right side auxiliary unit comprising:
      a right side auxiliary light unit housing, said right side auxiliary light unit housing adapted to be mounted to a right side handle bar guard of a motorcycle; and
      a right side auxiliary light coupled to said right side auxiliary light unit housing; and
   a left side auxiliary light unit, said left side auxiliary light unit housing adapted to be mounted to a left side handle bar guard of a motorcycle, said left side auxiliary unit comprising:
      a left side auxiliary light unit housing; and
      a left side auxiliary light coupled to said left side auxiliary light unit housing.

2. The removeable lighting system of claim 1 wherein said right side auxiliary light is electrically coupled to said battery, and wherein said left side auxiliary light is electrically coupled to said battery.

3. The removeable lighting system of claim of claim 1 wherein said auxiliary lights are coupled to said auxiliary light unit housings with a 2 axis adjustable mount.

4. The removeable lighting system of claim 3 wherein said 2 axis adjustable mounts are frictional mounts using spherical interfaces.

5. The removable lighting system of claim 4 wherein said 2 axis adjustable mounts comprise a positioning tab adapted to allow a user to set the light position by moving said positioning tab by hand.

6. The removable lighting system of claim 3 wherein said 2 axis adjustable mounts comprise a positioning tab adapted to allow a user to set the light position by moving said positioning tab by hand.

7. A removeable lighting system for a motorcycle, said removeable lighting system comprising:
   a headlight unit main body;
   a headlight coupled to said headlight unit main body;
   a rechargeable battery, said battery coupled said headlight unit main body and electrically coupled to said headlight; and
   a mounting system for said headlight unit main body, said mounting system adapted to mount said headlight unit main body to the upper end of a motorcycle front end, said mounting system comprising:
      an upper right mounting element, said upper right mounting element coupled to an upper right portion of said headlight unit main body;
      an upper left mounting element, said upper left mounting element coupled to an upper left portion of said headlight unit main body;
      a lower right mounting element, said lower right mounting element coupled to a lower right portion of said headlight unit main body
   a lower left mounting element, said lower left mounting element coupled to an lower left portion of said headlight unit main body, wherein said mounting elements comprise a length of flexible material adapted to wrap around a cylindrical interface;

a right side auxiliary light unit, said right side auxiliary light unit housing adapted to be mounted to a right side handle bar guard of a motorcycle, said right side auxiliary unit comprising:
  a right side auxiliary light unit housing; and
  a right side auxiliary light coupled to said right side auxiliary light unit housing; and
a left side auxiliary light unit, said left side auxiliary light unit housing adapted to be mounted to a left side handle bar guard of a motorcycle, said left side auxiliary unit comprising:
  a left side auxiliary light unit housing; and
a left side auxiliary light coupled to said left side auxiliary light unit housing.

8. The removeable lighting system of claim 7 wherein said right side auxiliary light is electrically coupled to said battery, and wherein said left side auxiliary light is electrically coupled to said battery.

* * * * *